United States Patent [19]
Liu

[11] Patent Number: 5,586,488
[45] Date of Patent: Dec. 24, 1996

[54] PORTABLE PIZZA OVEN

[75] Inventor: Simon Y. Liu, West Bend, Wis.

[73] Assignee: Americorp Inc., West Bend, Wis.

[21] Appl. No.: 538,751

[22] Filed: Oct. 3, 1995

Related U.S. Application Data

[60] Provisional application No. 60/000,364 Jun. 20, 1995.

[51] Int. Cl.$^6$ ............................. A47J 37/00; A47J 37/08
[52] U.S. Cl. .............................. 99/331; 99/389; 99/391; 99/392; 99/394; 99/422; 99/476; 126/21 A; 219/400
[58] Field of Search ................. 99/385, 331–333, 99/389–394, 400, 401, 422, 450, 372, 375, 378, 476; 219/400, 401; 126/21 A

[56] References Cited

U.S. PATENT DOCUMENTS

| | | | |
|---|---|---|---|
| D. 347,548 | 6/1994 | Boehm et al. | D7/352 |
| 716,365 | 12/1902 | Bayno | 99/392 X |
| 917,195 | 4/1909 | VanAller | 99/392 |
| 1,903,324 | 4/1933 | Codling | 99/392 |
| 1,931,450 | 10/1933 | Warner | 99/391 |
| 2,025,898 | 12/1935 | Rhodes | 99/392 |
| 2,031,995 | 2/1936 | Yost | 219/35 |
| 2,465,577 | 3/1949 | Cox | 99/341 |
| 2,578,034 | 12/1951 | Baltzell | 99/327 |
| 2,738,723 | 3/1956 | Jennett | 99/329 |
| 2,804,818 | 9/1957 | March | 99/345 |
| 2,949,524 | 8/1960 | Scarioni | 219/35 |
| 3,034,420 | 5/1962 | Wenger | 99/392 |
| 3,548,146 | 12/1970 | Hoyland | 219/200 |
| 3,697,725 | 10/1972 | Bielefeldt | 219/523 X |
| 3,746,837 | 7/1973 | Frey et al. | 99/391 X |
| 5,181,455 | 1/1993 | Masel et al. | 99/389 X |
| 5,378,872 | 1/1995 | Javanovic | 219/388 |

*Primary Examiner*—Timothy F. Simone
*Attorney, Agent, or Firm*—Michael, Best & Friedrich

[57] ABSTRACT

A portable pizza oven comprising a fixed upper casing, a fixed lower casing, the upper and lower casings defining therebetween an opening, an upper heater assembly located within and fixed to the upper casing, a lower heater assembly located within and fixed to the lower casing, so as to define a cooking chamber which is located between the heater assemblies and which is accessible via the opening, and a pan assembly insertable into and removable from the cooking chamber, the pan assembly including a circular tray having a diameter of slightly greater than twelve inches, the pan assembly also including a handle fixed to the tray, such that, when the pan assembly is inserted into the cooking chamber, the handle closes the opening, thereby closing the cooking chamber.

21 Claims, 7 Drawing Sheets

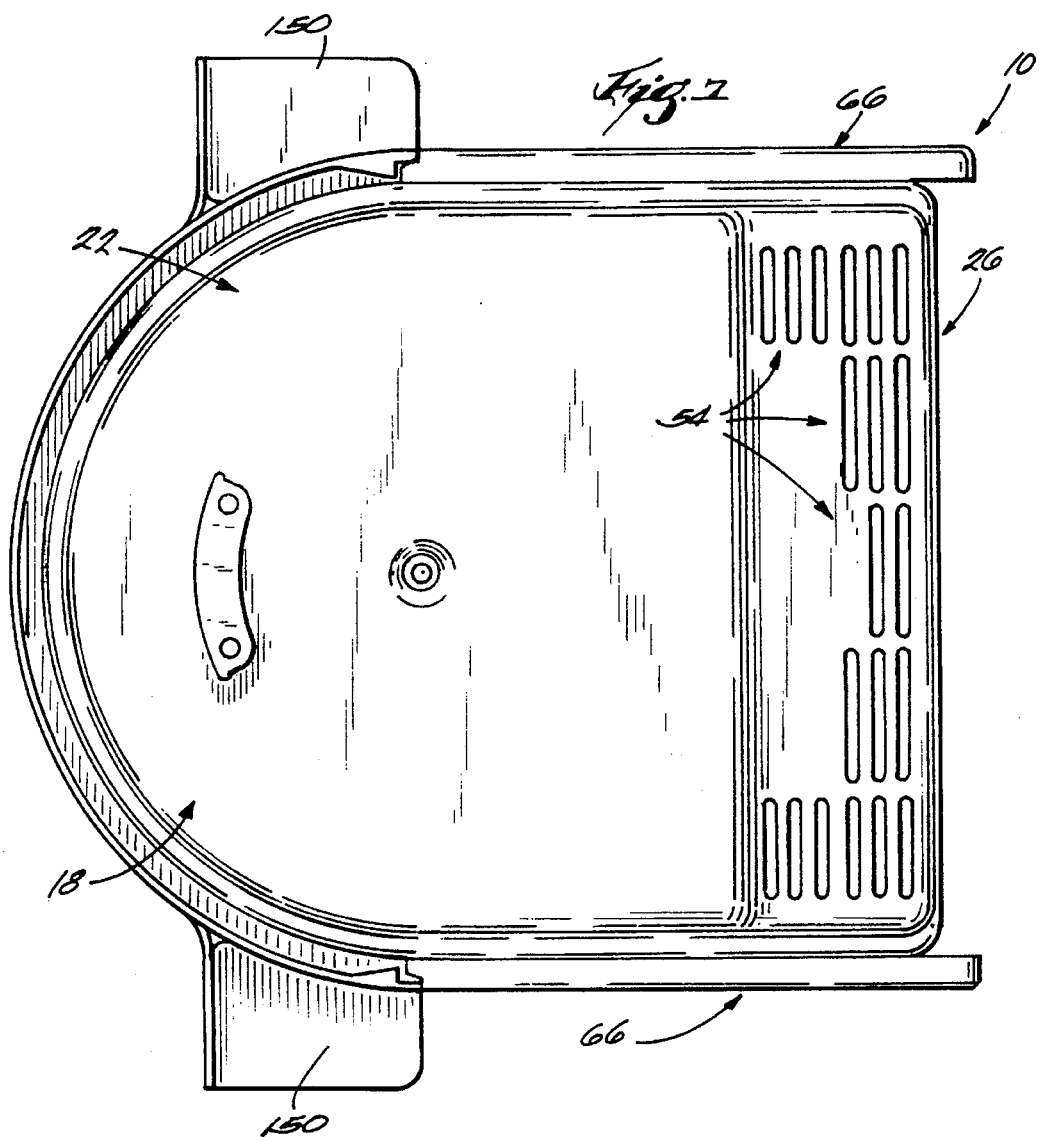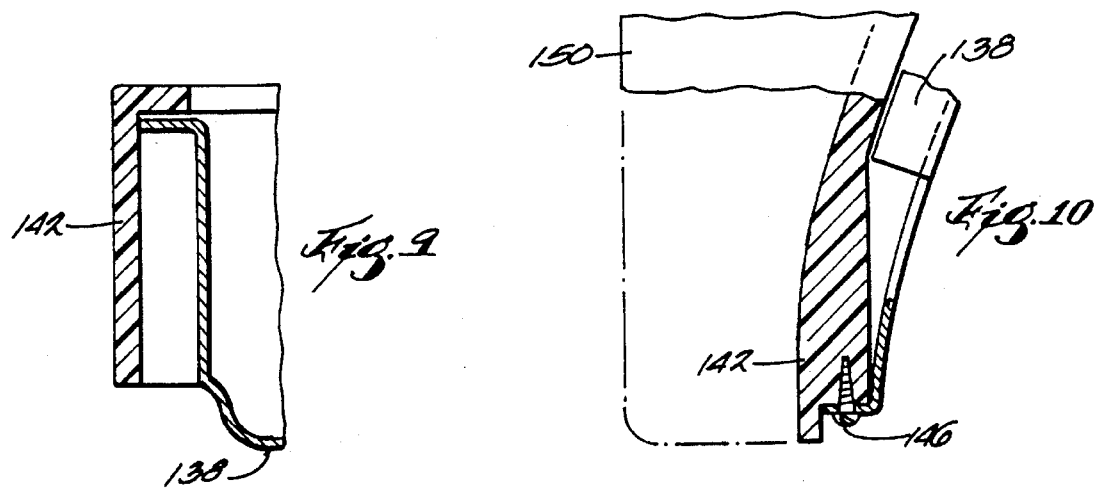

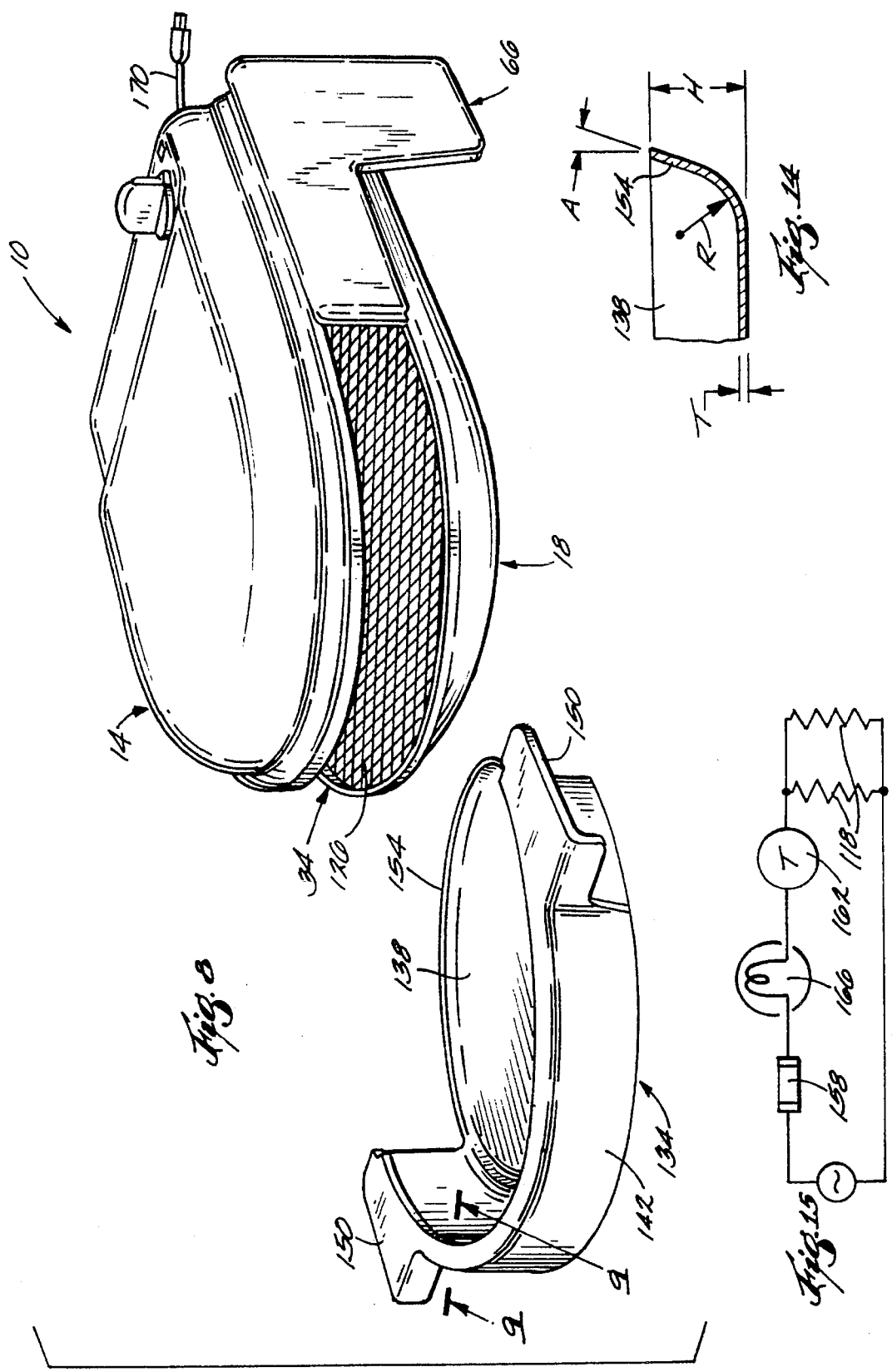

PORTABLE PIZZA OVEN

RELATED APPLICATION

Applicant claims the benefit under 35 USC 119 of copending U.S. Provisional patent application Ser. No. 60/000,364, filed Jun. 20, 1995 and titled "Portable Pizza Oven."

BACKGROUND OF THE INVENTION

The invention relates to apparatus for cooking food, and more particularly to portable cooking apparatus or ovens. Still more particularly, the invention relates to portable pizza ovens.

A known portable pizza oven includes upper and lower housings connected so that the upper housing can be pivoted upwardly for putting a pizza in and removing a pizza from the oven. The pizza is supported in the oven on a pizza stone.

SUMMARY OF THE INVENTION

The invention provides a portable pizza oven in which a pizza is cooked on a metal pan that slides into and out of the oven. An upper heating element is located above the pizza, and a lower heating element is located below the pan. The pan has a specially curved lip that holds the pizza on the pan during normal handling but that allows the pizza to easily slide off the pan, when desired, without the use of a spatula. This arrangement is easier to use, easier to maintain and provides a better quality crust than known prior art portable pizza ovens. Also, a pizza can be cooked more quickly because it is not necessary to heat a pizza stone before cooking a pizza. While being used for cooking, the pizza oven is supported above a counter top or other surface by a pair of rear legs and a front leg. The rear legs can also support the pizza oven in a vertical position (rotated 90° from the cooking position) for storage. When the pizza is in the vertical position, the front leg also functions as a handle allowing the pizza oven to be picked up and carried. The front leg has thereon a lip that facilitates gripping of the handle.

Other features and advantages of the invention will become apparent to those skilled in the art upon review of the following detailed description and drawings.

DESCRIPTION OF THE DRAWINGS

FIG. 7 is a bottom plan view of the pizza oven.

FIG. 8 is an exploded perspective view of the pizza oven.

FIG. 9 is a view taken along line 9—9 in FIG. 8.

FIG. 10 is a partial top view, partially broken away, of the pan assembly.

FIG. 14 is an enlarged partial sectional view of the tray.

FIG. 15 is a schematic of the electrical circuit of the pizza oven.

Figure 1:
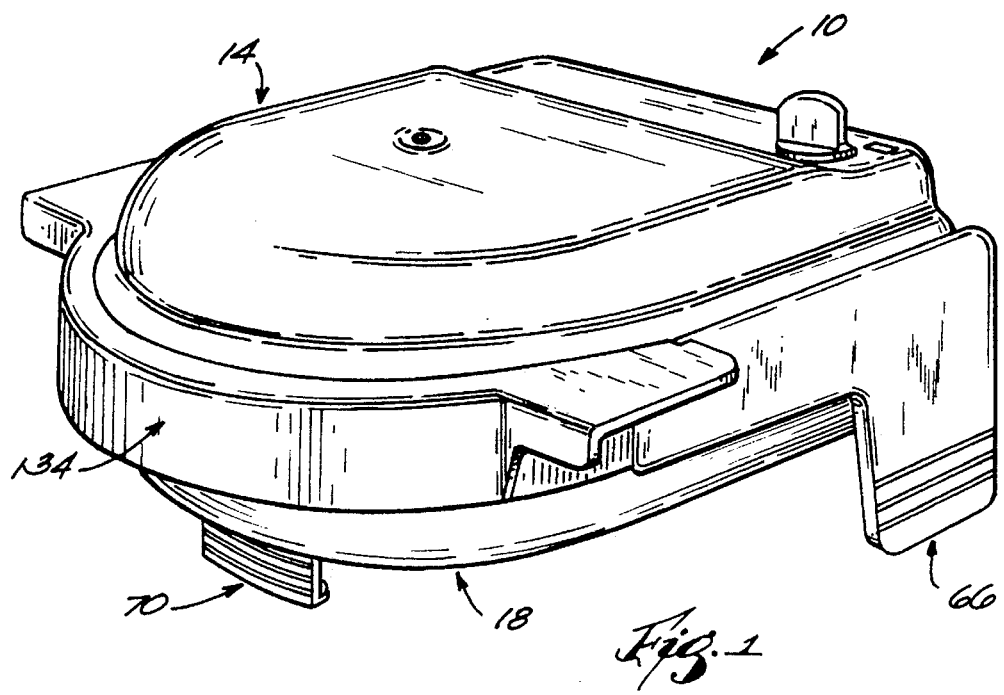
FIG. 1 is a perspective view of a portable pizza oven embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A portable pizza oven 10 embodying the invention is illustrated in the drawings.

The oven 10 comprises an upper casing 14 and a lower casing 18. While various suitable constructions can be employed, in the illustrated construction, the upper and lower casings 14 and 18 are substantially mirror images of each other. Each of the upper and lower casings 14 and 18 includes (see FIGS. 3 and 7) a circular dome-like portion 22 and a rectangular portion 26. Vertical side walls 30 (see FIG. 11) extend from the circular and rectangular portions. The side walls 30 extend downwardly on the upper casing 14 and extend upwardly on the lower casing 18. The side walls 30 define therebetween (see FIG. 8) an arcuate slot or opening 34.

Figure 6:
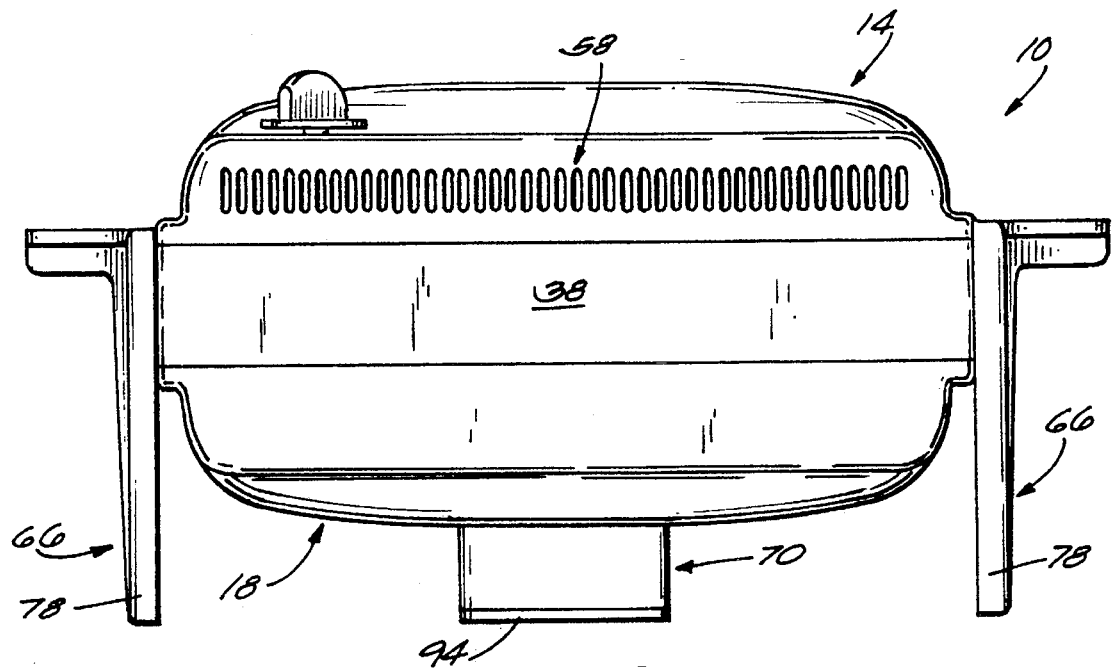
FIG. 6 is a rear elevational view of the pizza oven.
Figure 11:
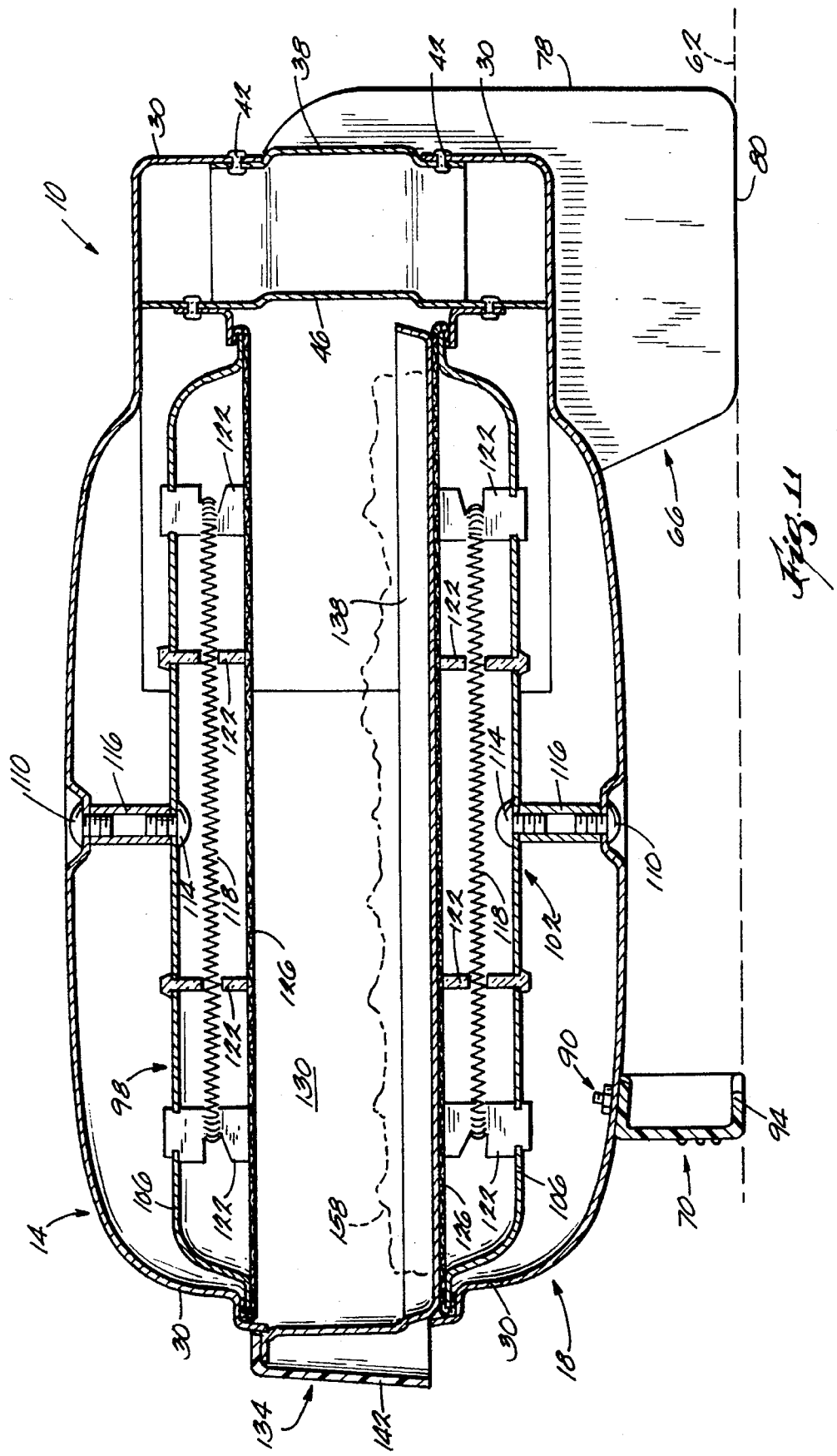
FIG. 11 is a vertical sectional view of the pizza oven.
Figure 12:
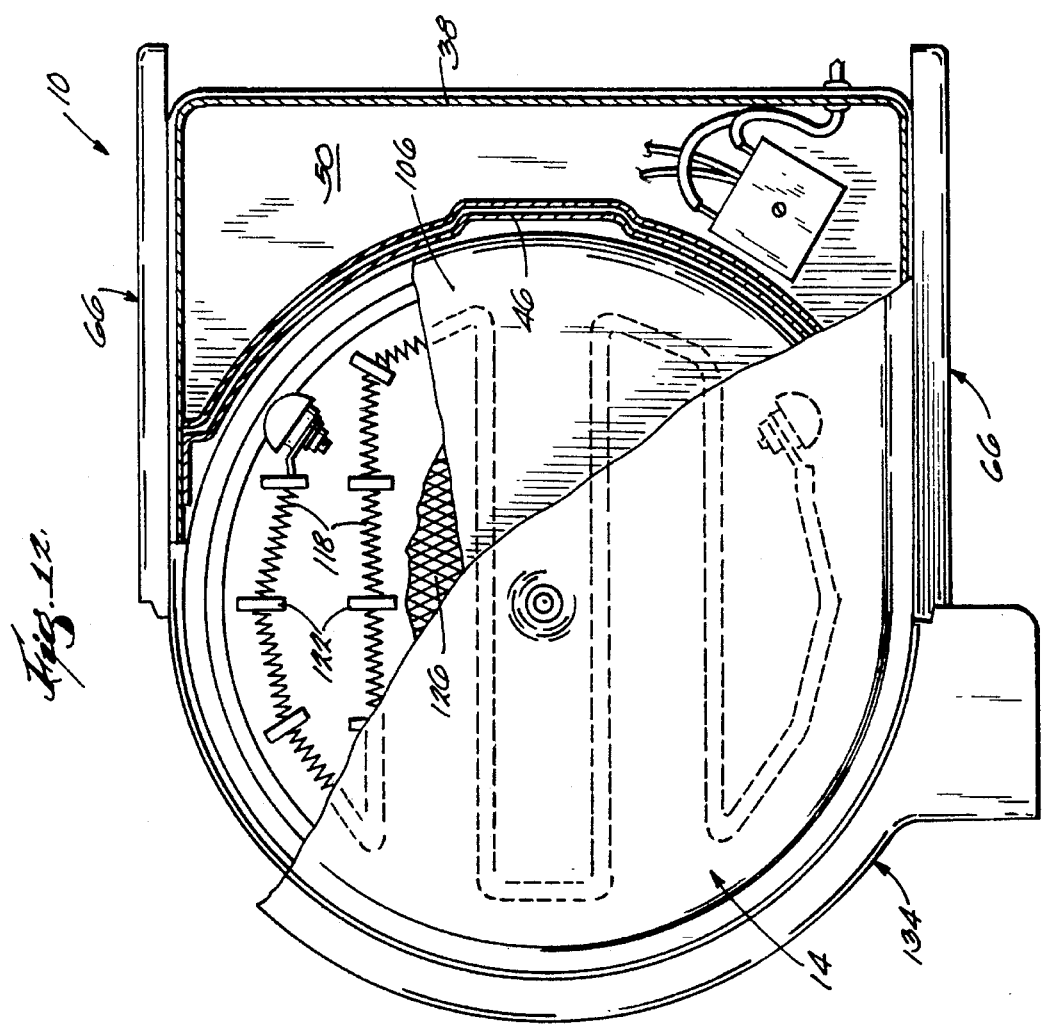
FIG. 12 is a view similar to FIG. 3 partially broken away.

A middle casing 38 (see FIGS. 6, 11 and 12) is located between and connects the upper and lower casings 14 and 18. As best shown in FIG. 12, the middle casing 38 is generally U-shaped. As best shown in FIG. 11, the middle casing 38 is secured to the vertical side walls 30 of the rectangular portions of the upper and lower casings 14 and 18. In the illustrated construction, the middle casing 38 is secured to the upper and lower casings 14 and 18 by suitable means such as screws or rivets 42. Any other suitable connecting means can be employed, or the upper and lower casings 14 and 18 and the middle casing 38 could be fabricated as a one-piece, integral unit.

Figure 2:
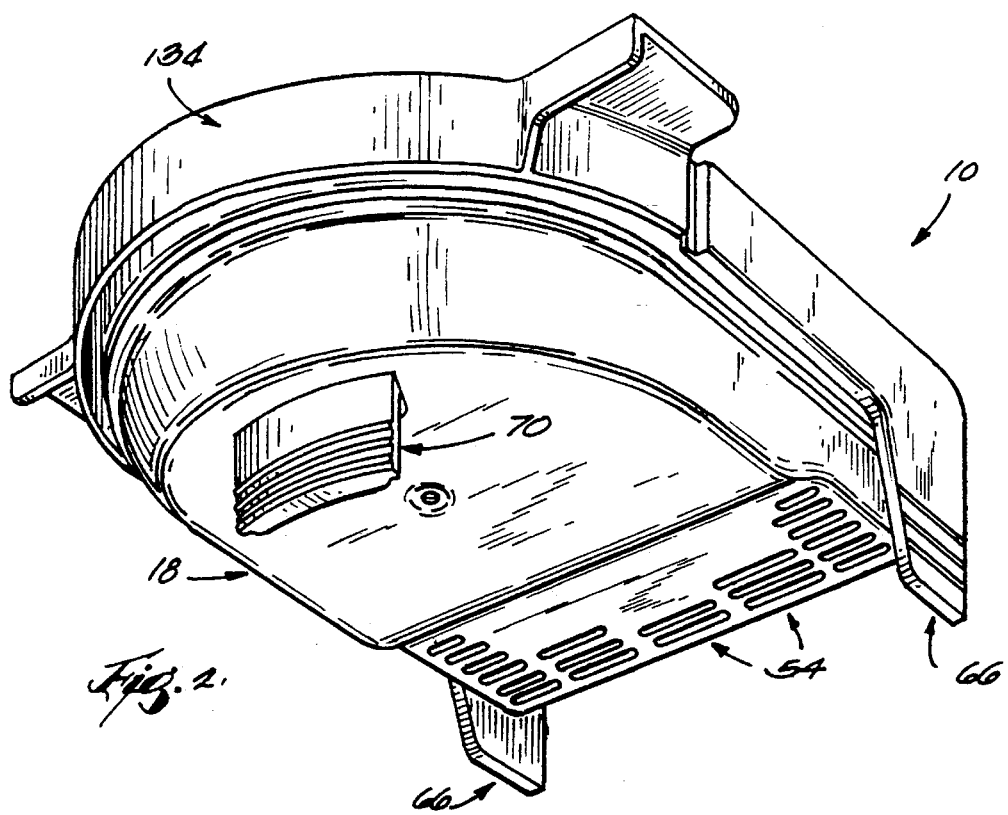
FIG. 2 is a bottom perspective view of the pizza oven.

The oven 10 also comprises (see FIGS. 11 and 12) a partition 46 which is located between and which is secured to both of the upper and lower casings 14 and 18. As best shown in FIG. 12, the partition 46 is arcuate and extends along an imaginary cylinder defined by the circular portions of the upper and lower casings 14 and 18. The partition 46 and the middle casing 38 define therebetween a chamber 50 which houses electrical components described below. Cooling for the electrical components is provided by louvers 54 (see FIGS. 2 and 7) in the lower casing 18 and by louvers 58 (see FIG. 6) in the rear side wall 30 of the upper casing 14. Natural convection provides air flow through the chamber 50 to cool the electrical components therein. Because no louvers are located in the top surface of the upper casing 14, liquid accidentally spilled on top of the oven 10 should not flow into the chamber 50.

Preferably, the upper, lower and middle casings and the partition are made of drawn metal. It should be understood, however, that other materials and other forming processes could be employed.

Figure 4:
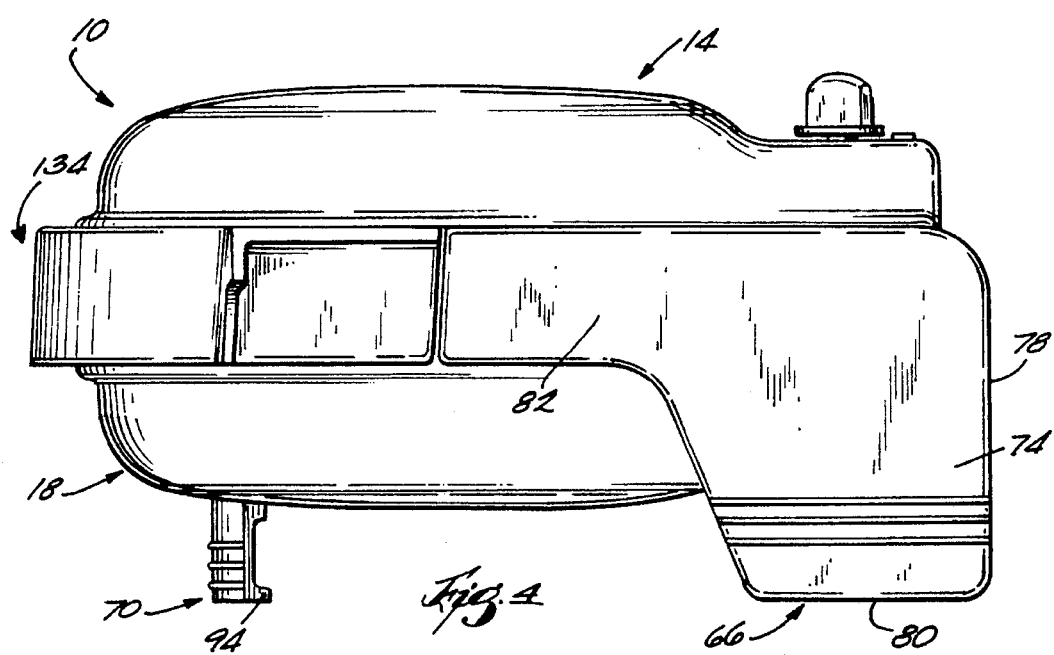
FIG. 4 is a right side elevational view of the pizza oven in the horizontal position.
Figure 5:
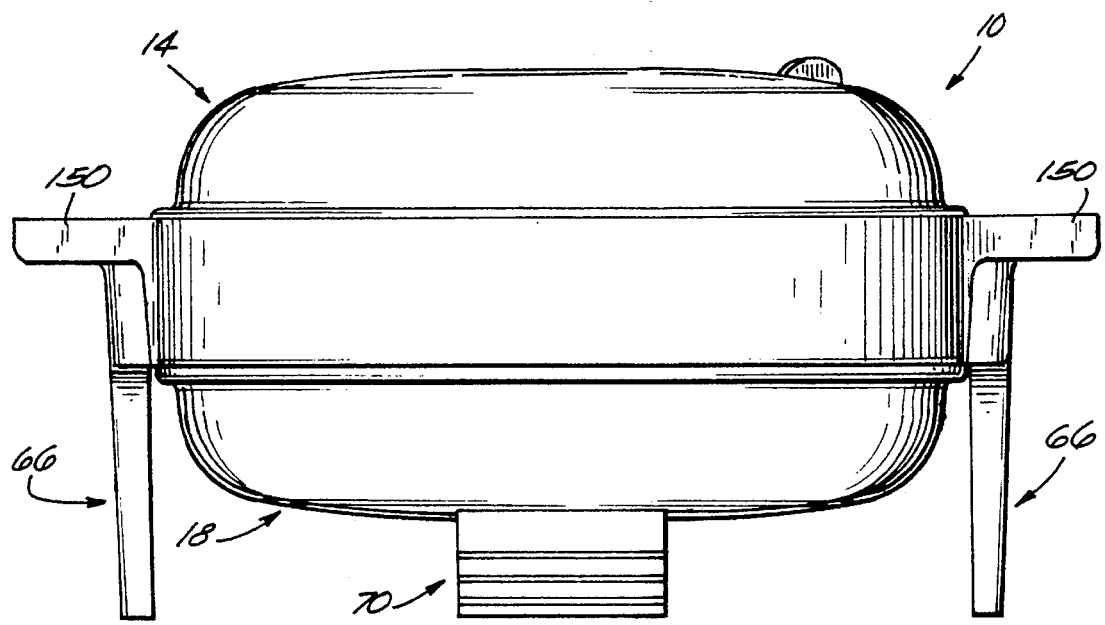
FIG. 5 is a front elevational view of the pizza oven.

The lower casing 18 is supported above a counter top or other supporting surface 62 (see FIG. 11) by a pair of rear legs 66 and by a front leg 70. The rear legs 66 are located on opposite sides of the rectangular portions and are secured to both of the upper and lower casings 14 and 18. The rear legs 66 are preferably mirror images of each other. Each rear leg 66 is L-shaped and includes, referring to FIG. 4, a vertical portion 74 fixed to the casings 14 and 18 by suitable means such as rivets or screws (not shown). The vertical portion 74 has a generally planar, vertically extending rear surface 78. As shown in FIG. 11, the rear surface 78 is spaced rearwardly from the rear surfaces 30 of the casings 14 and 18 so that the louvers 58 are not blocked if the oven 10 is pushed against a wall. The vertical portion 74 also has a generally planar, horizontally extending bottom surface 80. When the oven 10 is in a horizontal or cooking position, as shown in FIG. 11, the bottom surfaces 80 of the rear legs 66 rest on the supporting surface 62. The oven 10 can be rotated 90° to a vertical or storage position, shown in FIG. 13, in which the rear surfaces 78 rest on the supporting surface 62. Each rear leg 66 also includes (see FIG. 4) a horizontal portion 82 which extends forwardly from the upper end of the vertical portion 74.

Figure 13:
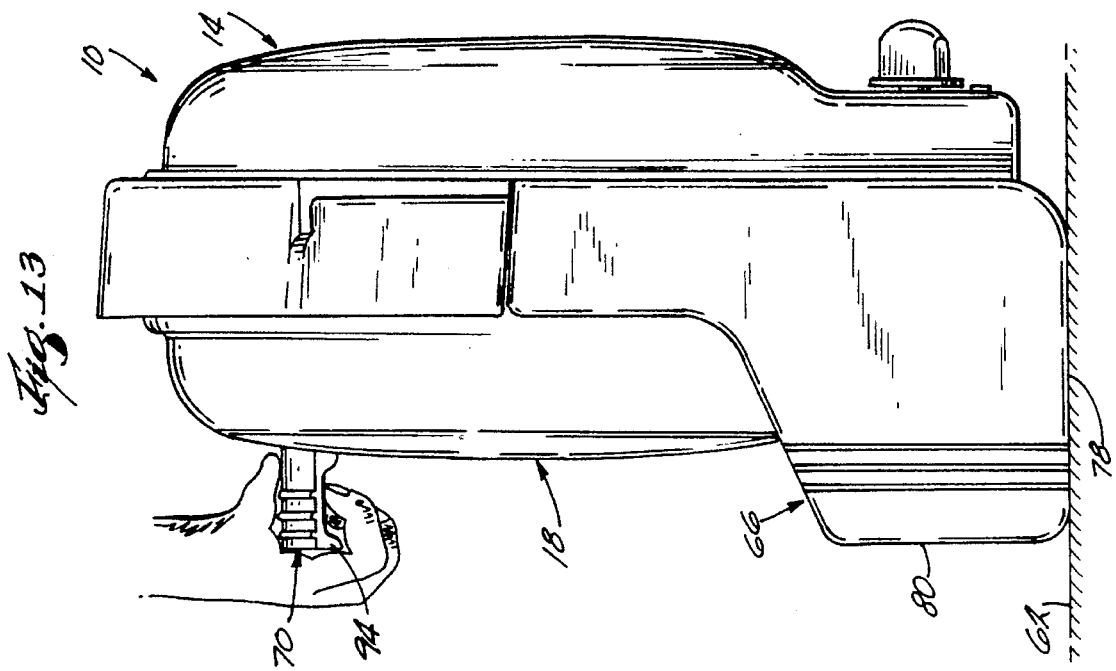
FIG. 13 is a side view of the pizza oven in the vertical position.

The front leg 70 is arcuate and extends downwardly from the lower casing 18 when the oven 10 is in the horizontal position. The front leg 70 is secured to the lower casing 18 by suitable means such as rivets, bolts or screws 90 (see FIG. 11). Referring to FIG. 11, the lower end of the front leg 70 has thereon a rearwardly extending lip 94. When the oven 10 is in the vertical position, as shown in FIG. 13, the front leg 70 serves as a handle allowing the oven 10 to be picked up and carried with one hand. The lip 94 facilitates gripping the front leg or handle. When the oven 10 is in the horizontal position, the bottom of the front leg 70 rests on the supporting surface 62. If desired, anti-skid pads (not shown) can be placed on the bottom surfaces of the rear legs 66 and on the bottom of the front leg 70.

The oven 10 also comprises (see FIG. 11) an upper heater assembly 98 and a lower heater assembly 102. The upper heater assembly 98 is located within and fixed to the upper casing 14, and the lower heater assembly 102 is located within and fixed to the lower casing 18. The heater assemblies 98 and 102 are mirror images of each other, and only the upper heater assembly 98 will be described in detail. Common elements have been given the same reference numerals.

The upper heater assembly 98 includes a generally circular inner housing 106. The periphery of the housing 106 engages the partition 46 and the side walls 30 of the upper casing 14, and the remainder of the housing 106 is spaced below the circular portion 22 of the upper casing 14. The housing 106 is secured to the upper casing 14 by bolts or screws 110 and 114 that thread into opposite ends of a spacer 116 between the housing 106 and the upper casing 14. A nickel chrome wire heating element 118 is supported below the inner housing 106 by ceramic members 122 fixed to the inner housing 106. A circular wire mesh screen 126 extends below and covers the heating element 118. The screen 126 is preferably made of steel, and the periphery of the screen 126 is crimped or otherwise fixed to the periphery of the inner housing 106. The screen 126 of the upper heater assembly 98 and the screen 126 of the lower heater assembly 102 define therebetween a cooking chamber 130 accessible via the slot or opening 34.

Figure 3:
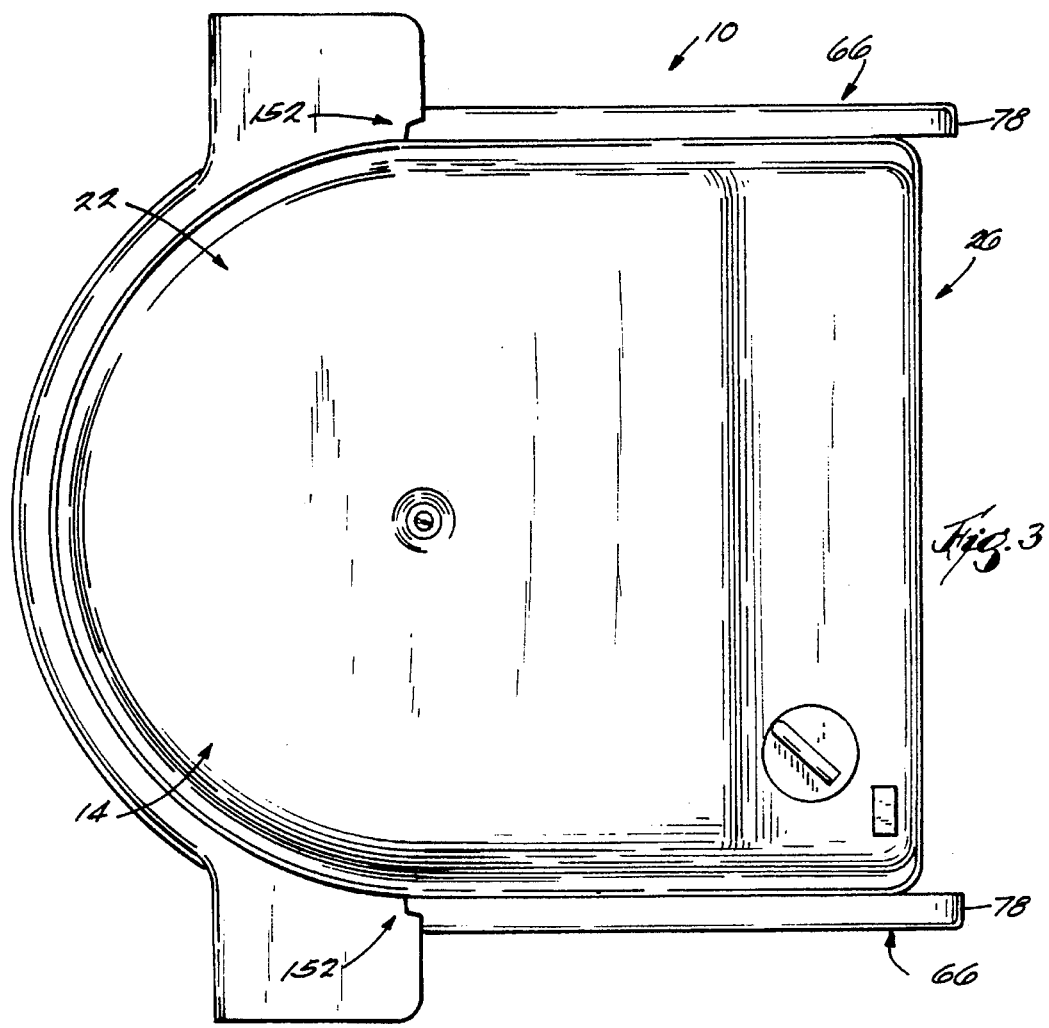
FIG. 3 is a top plan view of the pizza oven.

A pan assembly 134 (see FIGS. 8 and 11) is insertable into and removable from the cooking chamber 130. The pan assembly 134 includes a circular pan or tray 138 made of non-stick metal, preferably drawn metal. In the illustrated construction, the pan 138 has a diameter of slightly greater than twelve inches. The pan assembly 134 also includes a plastic handle 142 fixed to the pan 138 by suitable means such as screws or rivets 146 (see FIG. 10). The handle 142 is arcuate and extends around approximately 180 degrees of the pan 138. The handle 142 has handle portions 150 extending outwardly on opposite sides thereof. The handle 142 is preferably made of a thermosetting plastic, such as a phenolic. When the pan assembly 134 is inserted into the cooking chamber 130, the tray 138 rests on the mesh screen 126 of the lower heater assembly 102, and the handle 142 closes the opening 34, thereby closing the cooking chamber 130. As shown in FIG. 3, the handle 142 overlaps the forward end of the horizontal portion 82 of the leg 66 on each side of the oven 10 (see reference numerals 152 in FIG. 3) to provide a lap joint that prevents heat from escaping the cooking chamber 130, thereby improving browning of the pizza. The handle 142 is a very poor conductor of heat, so that the handle 142 does not become hot during normal use of the oven 10. The portion of the tray 138 not surrounded by the handle 142 has a curved lip 154 (see FIGS. 8 and 14) so that a pizza 158 (shown in phantom in FIG. 11) remains on the tray 138 during normal handling but easily slides off the tray 138 without the use of a spatula when desired. In the illustrated construction, as shown in FIG. 14, the tray 138 has a thickness T of 0.4 mm, the lip 154 has a height H of 13.3 mm and extends upwardly and outwardly at an A of sixteen degrees from vertical when the tray 138 is horizontal, and the curve between the bottom of the tray 138 and the lip 154 has a radius R of 10 mm.

The above-mentioned electrical components include (see FIG. 15) a fuse 158, a conventional timer 162, and a light 166 which indicates when the pizza oven 10 is on. A cord 170 plugs into a wall outlet, and the light 166, timer 162, and a fuse 158 are connected in series with the heating elements 118, which are in parallel.

Various features of the invention are set forth in the following claims.

I claim:

1. A portable pizza oven comprising a fixed upper casing, a fixed lower casing, the upper and lower casings defining therebetween an opening, an upper heater assembly located within and fixed to the upper casing, a lower heater assembly located within and fixed to the lower casing, so as to define a cooking chamber which is located between the heater assemblies and which is accessible via the opening, and a pan assembly insertable into and removable from the cooking chamber, the pan assembly including a tray and a handle fixed to the tray, such that, when the pan assembly is inserted into the cooking chamber, the handle closes the opening, thereby closing the cooking chamber, wherein said upper casing includes a circular dome-like portion, a rectangular portion, and vertical side walls extending downwardly from the circular and rectangular portions, and wherein said lower casing includes a circular dome-like portion, a rectangular portion, and vertical side walls extending upwardly from the circular and rectangular portions of the lower casing, the side walls of the upper and lower casings defining therebetween the opening.

2. A portable pizza oven as set forth in claim 1 and further comprising a generally U-shaped middle casing located between and connecting the upper and lower casings, and a partition which is located between and which is secured to both of the upper and lower casings, the partition being arcuate and extending along an imaginary cylinder defined by the circular portions of the upper and lower casings, the partition and the middle casing defining therebetween a chamber housing electrical components.

3. A portable pizza oven as set forth in claim 2 wherein the side walls of the upper casing include a rear side wall, and wherein cooling for the electrical components is provided by louvers in the lower casing and by louvers in the rear side wall of the upper casing.

4. A portable pizza oven as set forth in claim 2 wherein each heater assembly includes a generally circular inner housing with a periphery engaging the partition and the side walls of the associated casing, and the remainder of the inner housing being spaced from the circular portion of the associated casing, a heating element supported on the inner housing, and a wire mesh screen covering the heating element, the screen of the upper heater assembly and the screen of the lower heater assembly defining therebetween the cooking chamber.

5. A portable pizza oven comprising a fixed upper casing, a fixed lower casing, the upper and lower casings defining therebetween an opening, an upper heater assembly located within and fixed to the upper casing, a lower heater assembly located within and fixed to the lower casing, so as to define a cooking chamber which is located between the heater assemblies and which is accessible via the opening, a pan assembly insertable into and removable from the cooking chamber, the pan assembly including a tray and a handle fixed to the tray, such that, when the pan assembly is inserted into the cooking chamber, the handle closes the opening, thereby closing the cooking chamber, and a pair of legs located on opposite sides of the upper and lower casings, wherein the handle overlaps a portion of a leg on each side of the oven to provide a lap joint that prevents heat from escaping the cooking chamber.

6. A portable pizza oven comprising a fixed upper casing, a fixed lower casing, the upper and lower casings defining therebetween an opening, an upper heater assembly located within and fixed to the upper casing, a lower heater assembly located within and fixed to the lower casing, so as to define a cooking chamber which is located between the heater assemblies and which is accessible via the opening, and a pan assembly insertable into and removable from the cooking chamber, the pan assembly including a tray and a handle fixed to the tray, such that, when the pan assembly is inserted into the cooking chamber, the handle closes the opening, thereby closing the cooking chamber, wherein the handle is arcuate and extends around approximately 180 degrees of the tray, the handle having handle portions extending outwardly on opposite sides thereof.

7. A portable pizza oven as set forth in claim 6 wherein said tray is circular and has a diameter of slightly greater than twelve inches, and wherein the tray is made of non-stick metal and has a curved lip so that a pizza remains on the tray during normal handling but easily slides off the tray without the use of a spatula when desired.

8. A portable pizza oven comprising a main housing defining an opening, at least one rear leg and a front leg for supporting the housing above a supporting surface, the rear leg including a rear surface which rests on the supporting surface when the oven is in a vertical or storage position, the rear leg also including a bottom surface which rests on the supporting surface when the oven is in a horizontal or cooking position, the front leg extending downwardly from the lower casing and resting on the supporting surface when the oven is in the horizontal position, such that, when the oven is in the vertical position, the front leg serves as a handle allowing the oven to be picked up and carried, an upper heater assembly located within and fixed to the housing, a lower heater assembly located within and fixed to the housing, so as to define a cooking chamber which is located between the heater assemblies and which is accessible via the opening, and a tray insertable into and removable from the cooking chamber via the opening.

9. A portable pizza oven as set forth in claim 8 wherein the oven comprises a pair of rear legs, the rear legs being located on opposite sides of the upper and lower casings, the rear legs each including a rear surface which rests on the supporting surface when the oven is in a vertical or storage position, and a bottom surface which rests on the supporting surface when the oven is in a horizontal or cooking position.

10. A portable pizza oven as set forth in claim 9 wherein each of the rear legs is L-shaped and each includes a vertical portion fixed to the upper and lower casings, the vertical portion having an upper end and the associated rear surface, the vertical portion also having the associated bottom surface, each rear leg also including a horizontal portion which extends forwardly from the upper end of the vertical portion.

11. A portable pizza oven as set forth in claim 10 and further comprising a handle fixed to the tray, wherein the handle overlaps the horizontal portion of a leg on each side of the oven to provide a lap joint that prevents heat from escaping the cooking chamber.

12. A portable pizza oven as set forth in claim 8 wherein the front leg has a lower end having thereon a rearwardly extending lip facilitating gripping of the front leg for carrying the oven.

13. A portable pizza oven as set forth in claim 8 wherein the main housing includes a fixed upper casing and a fixed lower casing.

14. A portable pizza oven as set forth in claim 13 wherein the upper casing includes a circular dome-like portion, a rectangular portion, and vertical side walls extending downwardly from the circular and rectangular portions, and wherein the lower casing includes a circular dome-like portion, a rectangular portion, and vertical side walls extending upwardly from the circular and rectangular portions of the lower casing, the side walls of the upper and lower casings defining therebetween the opening.

15. A portable pizza oven as set forth in claim 14 and further comprising a generally U-shaped middle casing located between and connecting the upper and lower casings, and a partition which is located between and which is secured to both of the upper and lower casings, the partition being arcuate and extending along an imaginary cylinder defined by the circular portions of the upper and lower casings, the partition and the middle casing defining therebetween a chamber housing electrical components.

16. A portable pizza oven as set forth in claim 14 wherein each heater assembly includes a generally circular inner housing with a periphery engaging the side walls of the associated casing, and the remainder of the inner housing being spaced from the circular portion of the associated casing, a heating element supported on the inner housing, and a wire mesh screen covering the heating element, the screen of the upper heater assembly and the screen of the lower heater assembly defining therebetween the cooking chamber.

17. A portable pizza oven as set forth in claim 8 wherein the tray is made of non-stick metal and has a curved lip so that a pizza remains on the tray during normal handling but easily slides off the tray without the use of a spatula when desired.

18. A portable pizza oven as set forth in claim 8 and further comprising a handle fixed to the tray, the handle being a poor conductor of heat.

19. A portable pizza oven as set forth in claim 18 wherein the handle is arcuate and extends around approximately 180 degrees of the tray, the handle having handle portions extending outwardly on opposite sides thereof.

20. A portable pizza oven comprising

- a fixed upper casing including a circular dome-like portion, a rectangular portion, and vertical side walls, including a rear side wall, extending downwardly from the circular and rectangular portions,

- a fixed lower casing including a circular dome-like portion, a rectangular portion, and vertical side walls extending upwardly from the circular and rectangular portions of the lower casing, the side walls of the upper and lower casings defining therebetween an arcuate opening,

- a generally U-shaped middle casing located between and connecting the upper and lower casings,

- a partition which is located between and which is secured to both of the upper and lower casings, the partition being arcuate and ,extending along an imaginary cylinder defined by the circular portions of the upper and lower casings, the partition and the middle casing defining therebetween a chamber housing electrical components, cooling for the electrical components being provided by louvers in the lower casing and by louvers in the rear side wall of the upper casing,

- a pair of rear legs and a front leg for supporting the lower casing above a supporting surface, the rear legs being located on opposite sides of the rectangular portions and being secured to both of the upper and lower casings, the rear legs each being L-shaped and each including a vertical portion fixed to the upper and lower casings, the vertical portion having an upper end and a generally planar, vertically extending rear surface which is spaced rearwardly from the upper and lower casings and which rests on the supporting surface when the oven is in a vertical or storage position, the vertical portion also having a generally planar, horizontally extending bottom surface which rests on the supporting surface when the oven is in a horizontal or cooking position, each rear leg also including a horizontal portion which extends forwardly from the upper end of the vertical portion, the front leg having a lower end and being arcuate, the front leg extending downwardly from the lower casing and resting on the supporting surface when the oven is in the horizontal position, the lower end of the front leg having thereon a rearwardly extending lip, such that, when the oven is in the vertical position, the front leg serves as a handle allowing the oven to be picked up and tarried with one hand, the lip facilitating gripping the front leg,

- an upper heater assembly located within and fixed to the upper casing, and a lower heater assembly located within and fixed to the lower casing, each heater assembly including a generally circular inner housing with a periphery engaging the partition and the side walls of the associated casing, and the remainder of the inner housing being spaced from the circular portion of the associated casing, a heating element supported on the inner housing, and a wire mesh screen covering the heating element, the screen of the upper heater assembly and the screen of the lower heater assembly defining therebetween a cooking chamber accessible via the opening, and

- a pan assembly insertable into and removable from the cooking chamber, the pan assembly including a circular tray made of non-stick metal, the tray having a diameter of slightly greater than twelve inches, the pan assembly also including a handle fixed to the tray, the handle being a poor conductor of heat, the handle being arcuate and extending around approximately 180 degrees of the tray, the handle having handle portions extending outwardly on opposite sides thereof, such that, when the pan assembly is inserted into the cooking chamber, the tray rests on the mesh screen of the lower heater assembly, and the handle closes the opening, thereby closing the cooking chamber, the tray having a curved lip so that a pizza remains on the tray during normal handling but easily slides off the tray without the use of a spatula when desired.

21. A portable pizza oven as set forth in claim 20 wherein the handle overlaps the horizontal portion of a leg on each side of the oven to provide a lap joint that prevents heat from escaping the cooking chamber.

* * * * *